United States Patent
Gao

(10) Patent No.: US 10,347,044 B2
(45) Date of Patent: Jul. 9, 2019

(54) IMAGING BARCODE SCANNER WITH THREE-DIMENSIONAL ITEM RECONSTRUCTION

(71) Applicant: Datalogic USA, Inc., Eugene, OR (US)

(72) Inventor: WenLiang Gao, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 0 days.

(21) Appl. No.: 15/844,390

(22) Filed: Dec. 15, 2017

(65) Prior Publication Data

US 2018/0174358 A1    Jun. 21, 2018

Related U.S. Application Data

(60) Provisional application No. 62/435,317, filed on Dec. 16, 2016.

(51) Int. Cl.
| | |
|---|---|
| *G06F 17/00* | (2019.01) |
| *G06K 7/10* | (2006.01) |
| *G06T 17/10* | (2006.01) |
| *G07G 1/00* | (2006.01) |

(52) U.S. Cl.
CPC .......... *G06T 17/10* (2013.01); *G06K 7/10762* (2013.01); *G06K 7/10861* (2013.01); *G07G 1/0045* (2013.01); *G07G 1/0063* (2013.01)

(58) Field of Classification Search
USPC ..... 235/375, 462.14, 462.15, 462.25, 462.32
See application file for complete search history.

(56) References Cited

U.S. PATENT DOCUMENTS

| | | |
|---|---|---|
| 5,220,536 A | 6/1993 | Stringer et al. |
| 5,636,028 A | 6/1997 | Stringer et al. |
| 6,484,066 B1 | 11/2002 | Riess et al. |
| 6,619,550 B1 | 9/2003 | Good et al. |
| 7,344,082 B2 | 3/2008 | Zhu et al. |
| 8,746,564 B2 | 6/2014 | Olmstead et al. |
| 2012/0187195 A1 | 7/2012 | Actis et al. |
| 2013/0020391 A1 | 1/2013 | Olmstead et al. |
| 2013/0235368 A1 | 9/2013 | Tornwall et al. |
| 2014/0015867 A1* | 1/2014 | Xin ................. G02B 27/2271 345/690 |
| 2014/0052555 A1 | 2/2014 | Macintosh |
| 2014/0126694 A1* | 5/2014 | Abenaim ............ G01V 5/0008 378/57 |
| 2015/0097032 A1 | 4/2015 | Olmstead et al. |

(Continued)

OTHER PUBLICATIONS

International Searching Authority European Patent Office, International Search Report and Written Opinion, PCT/US2017/066856, dated Mar. 29, 2018, 12 pp.

*Primary Examiner* — Tuyen K Vo
(74) *Attorney, Agent, or Firm* — Stoel Rives LLP

(57) ABSTRACT

A data reading system and method for constructing a three-dimensional model of an item passing through a read zone of the data reading system, the system including a plurality of light transmitters each operable to generate a light curtain across the read zone. As the items interrupt each of the light curtains, a height measurement of the item is obtained. Thereafter, the data reading system combines the height measurement data from each of the light curtains taken at various times, and generates a three-dimensional model of the item based on the obtained data.

20 Claims, 4 Drawing Sheets

(56) References Cited

U.S. PATENT DOCUMENTS

2015/0278566 A1* 10/2015 Hammer ............ G06K 7/10574
                                                    235/462.32
2015/0310242 A1* 10/2015 Wehrle ............... G06K 7/10732
                                                    235/470
2016/0063755 A1    3/2016 Cancro et al.

* cited by examiner

IMAGING BARCODE SCANNER WITH THREE-DIMENSIONAL ITEM RECONSTRUCTION

RELATED APPLICATIONS DATA

This application is a nonprovisional of and claims the benefit under 35 U.S.C. § 119(e) of U.S. Provisional Patent Application No. 62/435,317, filed Dec. 16, 2016, the disclosure of which is incorporated by reference herein in its entirety.

BACKGROUND

The field of the present disclosure relates generally to data reading systems, and more particularly, to data reading systems including imaging scanners capable of acquiring dimensional information from items moving through the data reading system and using the acquired dimensional information to construct a three-dimensional model of the items passing through the data reading system.

Automated data reading systems are used in many different environments to identify and measure objects (e.g., packages, parcels, grocery items, products, luggage, etc.) as the objects are transported along a belt or other conveyor system. Some example data reading systems include automated tunnel-type scanners that incorporate multiple imagers or cameras positioned around a conveyor system, the imagers operable to obtain barcode information from the passing objects within a three-dimensional scanning volume. Some automated systems are further operable to obtain dimensional information (e.g., length, width, and height) of the objects. Such systems may use reflection based methods, such as laser-based triangulation, stereo imaging, and structure lighting (triangulation), to determine object dimensions. However, these methods are based on the surface characteristics of the items and the light source wavelength, thereby tending to be inaccurate under certain conditions, such as when the objects have high surface reflectivity (e.g., mirrors, aluminum cans, etc.) or dark surfaces. In addition, some of these systems and methods may have optical occlusion issues since the systems are not collimated systems.

The present inventor has therefore determined that it would be desirable to have an imaging system for a data reader with improved performance features and a streamlined collimated design for enhancing the accuracy of item dimensioning processes while reducing or eliminating occlusions issues and minimizing costs. The present inventor has also identified a need for such a data reading system operable to obtain accurate dimensional measurements for multiple items moving through a data reading zone via a conveyor or belt system. Additional aspects and advantages of such data reading systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, it should be understood that an automated checkout system in a retail establishment is merely one use for such a system and should not be considered as limiting. An automated checkout system with the characteristics and features described herein may alternatively be used, for example, in an industrial location such as a parcel distribution center (e.g., postal), warehouse, luggage distribution center, or in a retail goods distribution center.

FIGS. 1-4 collectively illustrate details of a data reading system operable to acquire height dimension information from passing items and construct a three-dimensional model of the items for processing using the acquired information. The data reading system may be arranged in a compact, cube footprint and includes three or more height sensors or light curtains arrange in a generally perpendicular configuration to help minimize potential ambiguities created by shadowing effects and/or improperly spaced items (e.g., items to close to one another). The height data acquired from the individual light curtains is combined together, along with speed information for the items moving through the light curtains, and distance information from the item to the light curtains, to construct the three-dimensional model. Additional details and information of these embodiments is further described below.

Figure 1:
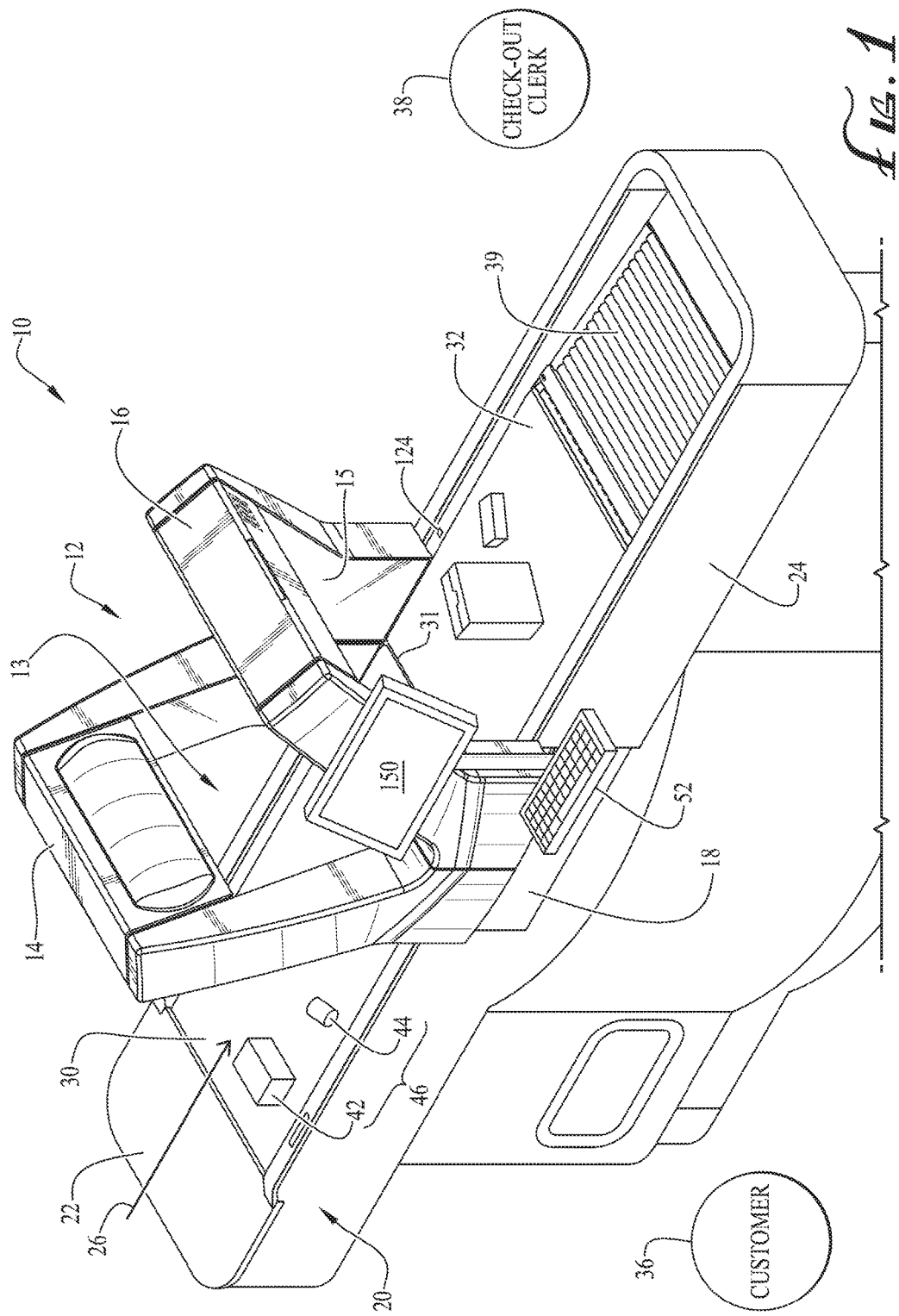
FIG. 1 is an isometric view of an automated data reading system, according to one embodiment.

FIG. 1 illustrates an automated checkout system 10 according to one embodiment. As is discussed in further detail below, the automated checkout system 10 may be used to identify an item or items 46 by reading and processing an optical code on the item(s) 46 (such as a package/box 42 and/or a can 44) during a checkout process in a supermarket or other retail establishment. It should be understood that in certain instances, item(s) 46 may refer to a single item or multiple items being transported simultaneously and processed in the automated checkout system 10.

In an example operation, a user, which could be either a customer 36 or check-out clerk 38, (collectively/alternately referred to as a "user") places the item(s) 46 onto a leading conveyor section 30 that transports the item(s) 46 in a substantially linear direction of motion 26 toward a scanner unit 12. Preferably, the items 46 are placed on the leading conveyor section 30 sequentially, in single file, to avoid the scanner units 12, 18 mistakenly reading multiple items as a single item. When the item(s) 46 pass through a read zone 13 of the scanner unit 12, various images of the items 46 are captured, including images of a bottom surface of the items 46 captured by a bottom scanner unit 18 reading through a gap 31 between the conveyor sections 30, 32, and processed to read the barcode or capture other data from the items 46. The images of the items 46 may be presented to the user via a display 150 for verification and/or to handle any reading errors that may have occurred. Thereafter, the items 46 transition onto a trailing conveyor section 32, which may deposit the items 46 into a bagging area 39 where the items 46 may be placed in a bag for the customer 36.

With reference to FIG. 1, the automated checkout system 10 includes a scanner unit 12 installed on a checkout counter 20. The checkout counter unit 20 includes an inlet end 22 and an outlet end 24, and the conveyor sections 30, 32 as described previously. Preferably, the conveyor sections 30, 32 operate at a constant speed, (e.g., 200-400 millimeters/second (mm/sec)), to optimize the performance of the scanner unit 12 and bottom scanner unit 18. The scanner unit 12 may include data capture devices 14, 16 in the form of arches extending over the conveyor sections 30, 32. Data capture devices 14, 16 include various components (such as data readers or imagers) for capturing images (such as top views, side views, etc.) or other information corresponding to the items 46 that are moved through a read zone 13 generally defined between the data capture devices 14, 16 of the scanner unit 12. The scanner units 12, 18 are each operable to capture images of items 46 as the items 46 are transported along conveyor sections 30, 32. The scanner units 12, 18 identify whether optical codes disposed on the items 46 are captured in the images and decode those optical codes that are captured. The scanner units 12, 18 may include different decoders (e.g., software algorithms, hardware constructs) to decode various types of optical codes including one-dimensional (e.g., linear) codes, (e.g., UPC, codabar, code 25, code 39, code 93, code 128, code 11, EAN8, EAN13, plessey, POSTNET) two-dimensional (e.g., matrix) codes (e.g., aztec code, maxicode, QR code, high-capacity color barcode, data matrix) stacked codes (PDF417, GS1 Databar), and watermark and feature recognition. In some embodiments, the automated checkout system 10 may include a separate optical decoding system (not shown) that receives and decodes the optical code from the scanner units 12, 18.

Further details and example embodiments of a scanner unit 12 are described in U.S. Pat. No. 8,746,564, the disclosure of which is incorporated herein by reference. As mentioned previously, the automated checkout system 10 may include a bottom reader section 18 that reads the bottom side of items 46 as they are passed over the gap 31 between the conveyor sections 30, 32. Additional details and example embodiments of such an automated checkout system are further described in U.S. Patent Application Pub. No. 2012/0187195, the disclosure of which is incorporated herein by reference.

It should be understood that automated checkout system 10 may include various modules or subsystems that perform various reading and processing tasks, in addition to the algorithm steps described in further detail below. One or more of these systems may include a processor, associated software or hardware constructs, and/or memory to carry out certain functions performed by the systems. The processors of the systems may be embodied in a single central processing unit, or may be distributed such that a system has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

Figure 2:
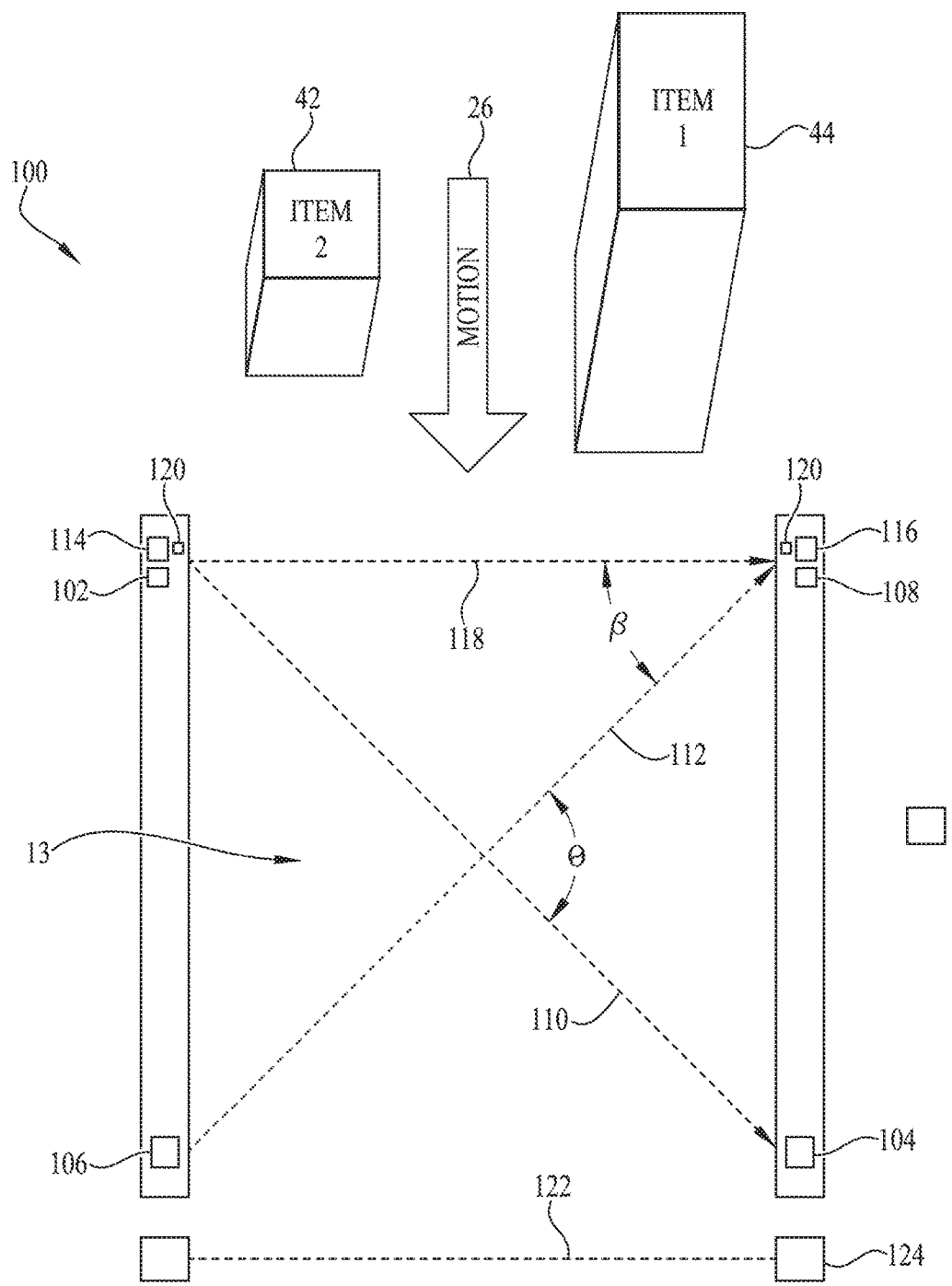
FIG. 2 schematically illustrates an example dimensioning system of the automated data reading system of FIG. 1 for acquiring three-dimensional information from one or more objects moving through the data reading system.
Figure 3:
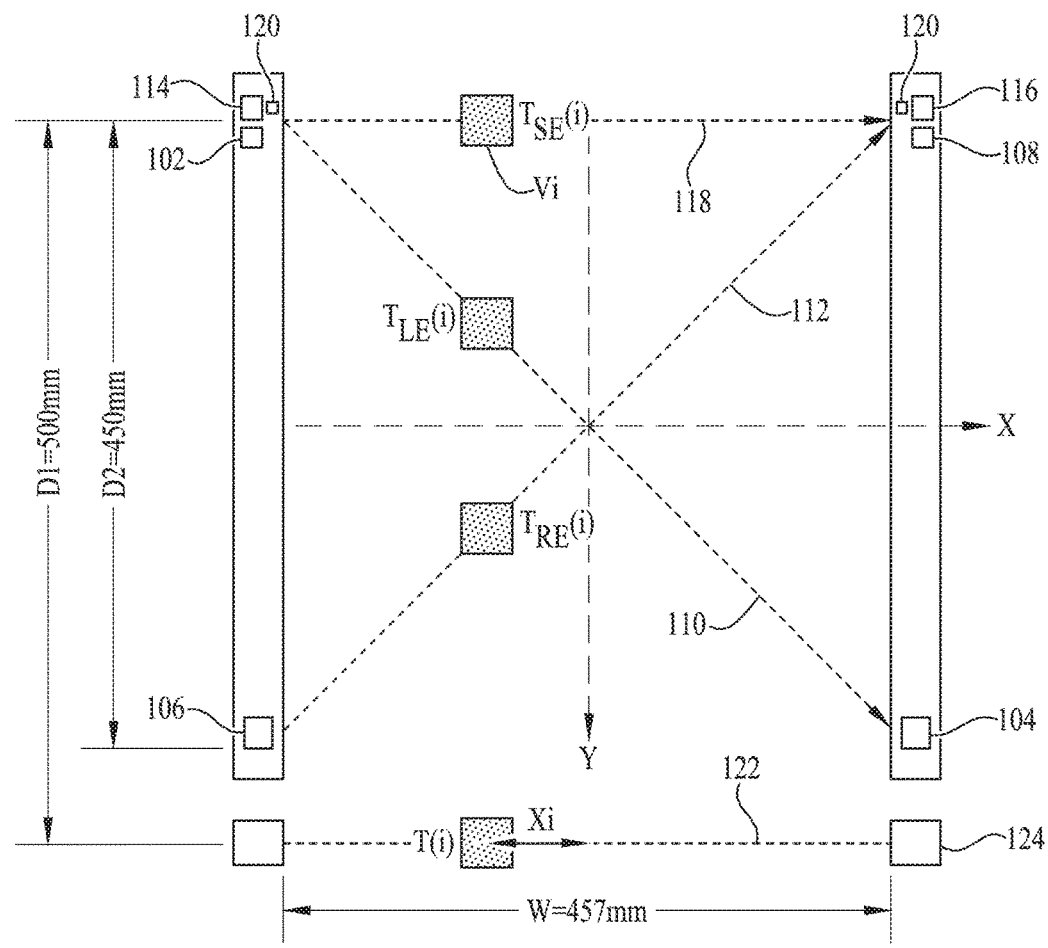
FIGS. 3 and 4 are schematic illustrations of the dimensioning system and collectively illustrate example processing techniques used in a reconstruction algorithm according to one embodiment.
Figure 4:
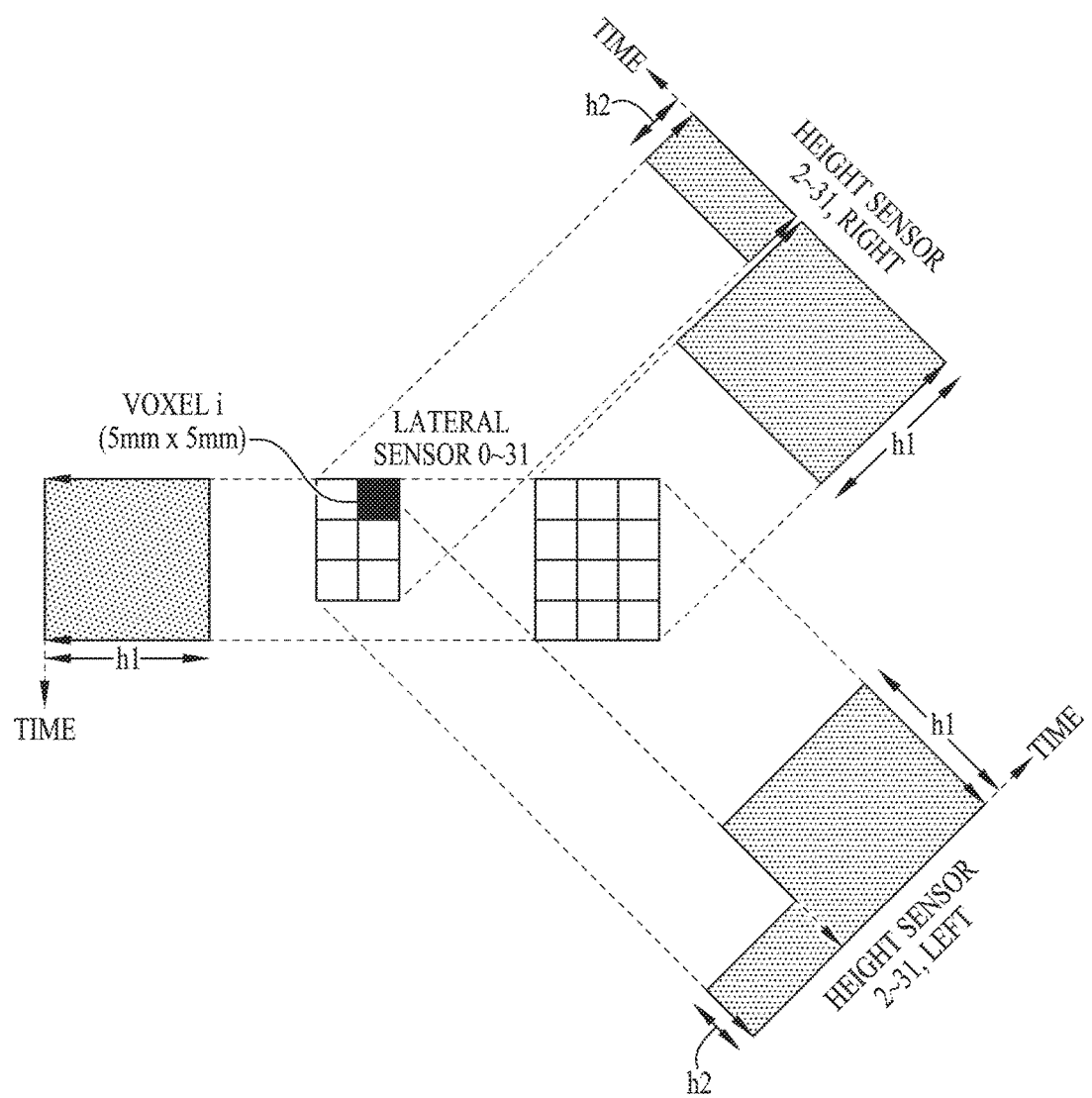

FIGS. 2-4 collectively illustrate a dimensioning sub-system 100 including a variety of sensors operable to acquire data as the items 42, 44 (collectively items 46) pass through the read zone 13 of the data reading system 10 of FIG. 1, where the dimensioning sub-system 100 uses a sensor data alignment algorithm based on the captured sensor data to create a three-dimensional reconstruction of the items 46. With reference to FIGS. 2-4, the following section provides additional details relating to an arrangement and alignment of the various sensors of the dimensioning sub-system 100, along with details relating to a sensor data alignment algorithm.

FIG. 2 is a schematic illustration of the dimensioning sub-system 100 of the automated data reading system 10 of FIG. 1, the system 100 operable to acquire data measurements from the passing items 42, 44 and to determine the three-dimensional spatial volume of the one or more items 42, 44 passing through the scanner units 12, 18 to construct a three-dimensional model of the items 42, 44. While not further referenced specifically herein, it should be understood that the system 100 incorporates a processor, associated software or hardware constructs, and/or memory to carry out all the functions as further described below.

With particular reference to FIG. 2, the dimensioning sub-system 100 includes a first pair of transmitter/receiver arrays including a first transmitter array 102 and a first receiver array 104, and a second pair of transmitter/receiver arrays including a second transmitter array 106 and a second receiver array 108, each of which is mounted to or supported by the scanner unit 12, such as via the lower leg portions 15 of the data capture devices 14, 16 (see FIG. 1). The transmitter arrays 102, 106 may comprise any suitable arrays capable of transmitting light, such as laser beams or light-emitting diodes (LEDs), toward the receivers 104, 108, respectively. The receivers 104, 108 are devices suitable for detecting the transmitted light received from the transmitter arrays 102, 106. For example, the receivers 104, 108 may be photodiodes or other sensor arrays.

In one embodiment, the transmitters 102, 106 are arranged so as to create light curtains 110, 112 (also referred to as height sensors in FIGS. 3-4 below), respectively, the light curtains 110, 112 extending vertically upwardly from the surface of the conveyor or other transport mechanism and operable to measure the height, width, and length dimensions of the items 42, 44 as they pass through the read zone 13. To effectively measure height information of the items 42, 44, the transmitters 102, 106 are preferably offset from the conveyor at a suitable height to generate light curtains 110, 112 capable of acquiring height information for a variety of items 42, 44 passing through the read zone 13. In one embodiment, the light curtains 110, 112 extend diagonally across the read zone 13 and cross one other in a substantially perpendicular configuration as illustrated in FIG. 2. In other words, the light curtains 110, 112 cross one another at an angle ⊖ of approximately 90°. In other embodiments, the angle ⊖ may range from between 60° to 120°, and preferably ranges between 80° to 95°. Preferably, the angle ⊖ is selected for any particular data reading system arrangement so as to minimize potential shadowing effects that may be created when items 42, 44 are disposed side-by-side relative to each other with insufficient spacing (e.g., the items are crowded together as they travel through the read zone 13), while also providing sufficient coverage to differentiate item heights for the passing items 42, 44. Accordingly, it should be understood that the foregoing range for the angle ⊖ is for illustration purposes and may change in other embodiments depending on the specific arrangement of the data reading system and its components.

Returning to FIG. 2, the dimensioning sub-system 100 further includes a third transmitter/receiver pair 114, 116 that generates a light curtain 118 extending transversely across the conveyor sections 30, 32 and read zone 13. For example, with reference to FIG. 2, the transmitter/receiver pair 114, 116 may be arranged to create the light curtain 118 oriented at an angle β relative to the light curtains 110, 112. In other embodiments, the angle β may be approximately 45°, or may range from between 30° and 60°.

In some embodiments, the transmitter/receiver pair 114, 116 may be arranged in a laterally offset configuration relative to the transmitter 102 and receiver 108 to avoid potential interference between the light curtains 112, 118. In other embodiments, it may be advantageous to use different light wavelengths for the transmitter/receiver pair 106, 108 and the transmitter/receiver pair 114, 116 to sufficiently distinguish the light curtains 112, 118 from one another and avoid interference or inconsistent measurements.

In some embodiments, the automated checkout system 10 further includes a speed sensor 120 operable to measure the speed of the conveyor sections 30, 32. In one embodiment, the speed sensor 120 may include two LED's and photo-diode pairs adjacent the transmitter/receiver pair 114, 116, where the LED/photodiode pairs are arranged at a minimal height such that the LED/photodiode pair is close to the surface of the conveyor sections 30, 32 to ensure that it accurately captures relatively small or flat items. Preferably, the conveyor sections 30, 32 are maintained at a constant speed of approximately 340 mm/s, but the conveyor speed may vary for different systems and/or for different item weights as desired. Accordingly, the speed sensor 120 may be used to accurately capture the real-time conveyor speed for the specific items being processed. In other embodiments, other suitable speed sensing mechanisms or systems may be used, such as a contact wheel on the conveyor belt, a rotary encoder associated with the conveyor drive, or other suitable mechanisms operable for measuring the conveyor speed.

As is further described in detail below with particular reference to FIGS. 3-4, when the items 42, 44 interrupt the various light curtains 110, 112, 118 (or height sensors) as they pass through the read zone 13, the dimensioning sub-system 100 measures the timing information and height information for the items 42, 44 as they interrupt each of the particular light curtains 110, 112, 118 across the read zone 13. The dimensioning sub-system 100 then uses an algorithm to construct a three-dimensional model of the respective items 42, 44 based on the measurements obtained from the light curtains 110, 112, 118 and the speed of the conveyor sections 30, 32 obtained by the speed sensor 120. Additional details of the algorithm are described below with reference to FIGS. 3-4.

FIG. 3 is a schematic illustration of the dimensioning sub-system 100 and FIG. 4 illustrates example projection profiles used in the three-dimensional reconstruction algorithm, in accordance with one embodiment. With collective reference to FIGS. 3 and 4, the following description provides additional detail of the sub-system 100 using three collimated light curtains arranged in a generally perpendicular configuration for generating three-dimensional reconstructions of the items being processed.

With particular reference to FIG. 3, after the items 42, 44 pass and interrupt the various light curtains 110, 112, 118 in sequence as the items 42, 44 move through the read zone 13, the items 42, 44 cross a light beam 122 generated by a lateral sensor 124 (see FIG. 2) positioned beyond an end of the read zone 13. After the items 42, 44 are detected by the sensor 124, a footprint binary image of each of the items 42, 44 is generated as further described in detailed below.

With particular reference to FIG. 4, the footprint binary image is separated into small regions of interest (ROIs), such as 5 mm×5 mm regions illustrated as voxels in FIG. 4. Once the binary image has been separated into voxels, the dimensioning sub-system 100 applies height data to each voxel, based on the height data obtained by the light curtains 110, 112, 118, the speed sensor 120, the lateral sensor 124, and the time stamp associated with the measurements (as further discussed below). The discussion below provides an example calculation for an individual voxel, described as voxel i ($V_i$), with the understanding that the same calculation may be repeated for all voxels in the region of interest. For ease of reference, the light curtains 110, 112, 118 may be referred to as height sensors in the calculations described below and illustrated in FIG. 3, with light curtain 110 being referred to as the left height sensor (or HSL), light curtain 112 being referred to as the right height sensor (or HSR), and the light curtain 118 being referred to as the side height sensor (or HSS).

With reference to FIG. 3, the location of voxel $V_i$ in the x-axis is denoted by the variable $X_i$, and the lateral sensor 122 detects voxel $V_i$ at time stamp $T_{(i)}$. As mentioned previously, when the items 42, 44 travel through the various light curtains 110, 112, 118, height data for the items 42, 44 is gathered based on where the light curtain 110, 112, 118 is interrupted by the respective items 42, 44 during its transport across the read zone 13. To apply the height data to each Voxel in the binary image, the imaging system 100 calculates the expected time stamp for each measurement from each of the transmitter/receiver pairs 102, 104, 106, 108, 114, 116 for voxel $V_i$ in accordance with the following equations:

$$T_{SE(i)} = T_{(i)} - D_1/V \quad (1)$$

$$T_{LE(i)} = T_{(i)} - [D_1 - (W/2 + X_i)\text{Tan}(45°)]/V \quad (2)$$

$$T_{RE(i)} = T_{(i)} - [(W/2 + X_i)\text{Tan}(45°) + D_1 - D_2]/V \quad (3)$$

where equation (1) represents the expected time stamp, $T_{SE(i)}$, for one of the items 42 crossing the light curtain 118 generated by the transmitter/receiver pair 114, 116; equation (2) represents the expected time stamp, $T_{LE(i)}$, for the item 42 crossing the light curtain 110 generated by the transmitter/receiver pair 102, 104; and equation (3) represents the expected time stamp $T_{RE(i)}$, for the item 42 crossing the light curtain 112 generated by the transmitter/receiver pair 106, 108. In the equations above, $D_1$ is the linear distance from the transmitter 114 to the lateral sensor 124, and $D_2$ is the linear distance from the transmitter 114 to the transmitter 106 (or transmitter 102 since these are parallel to each other).

Once the expected time stamps have been calculated, the dimensioning sub-system 100 assigns a height to voxel $V_i$. To assign the height, the dimensioning sub-system 100 analyzes the actual measurements obtained by the light curtains 110, 112, 118, where the measurements are output as follows:

$$HSS = \ldots HSS_{(k)}, T_S{(k)}; HSS_{(k+1)}, T_S{(k+1)} \ldots \quad (4)$$

$$HSR = \ldots HSR_{(m)}, T_R{(m)}; HSS_{(m+1)}, T_S{(m+1)} \ldots \quad (5)$$

$$HSL = \ldots HSL_{(n)}, T_L{(n)}; HSS_{(n+1)}, T_S{(n+1)} \ldots \quad (6)$$

where $HSS_{(k)}$ is the height measured by the light curtain 118 at a time stamp $T_S{(k)}$; $HSR_{(m)}$ is the height measured by the light curtain 112 at a time stamp $T_R{(m)}$; and $HSL_{(n)}$ is the height measured by the light curtain 110 at a time stamp $T_L{(n)}$.

With this data, the height of voxel $V_i$ is determined by assigning an HSS value to voxel $V_i$ where the time stamp $T_S$ is closest to the expected time $T_{SE(i)}$, and by assigning an HSR value to voxel $V_i$ where the time stamp $T_R$ is closest to expected time $T_{RE(i)}$, and by assigning an HSL value to voxel $V_i$ where the time stamp $T_L$ is closest to expected time $T_{LE(i)}$. In cases where the difference between the actual time stamp and the expected time stamp are greater than a predetermined tolerance, then no height will be assigned for that particular sensor value. Once the HSS, HSR, and HSL values have been assigned, the dimensioning sub-system 100 determines the final height for voxel $V_i$ as the minimum value of the three HSS, HSR, and HSL values. To create a three-dimensional model of the items 42, 44, the alignment algorithm described above is repeated for each of the voxels (ROIs) in the binary image so that each voxel is assigned height data. Once the algorithm is complete, the imaging system 100 is capable of constructing the three-dimensional model for the item by combining all the calculated voxel heights. The final three-dimensional reconstruction result may be further processed or filtered to remove measurement noise and outlier data.

It is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading system for constructing a three-dimensional model of an item passing through a read zone of the data reading system, the system comprising:
   a first light transmitter operable to generate a first light curtain across the read zone of the data reading system, wherein the first light curtain determines a first height dimension of the item at a first time when the item crosses the first light curtain;
   a second light transmitter operable to generate a second light curtain across the read zone of the data reading system, wherein the first and second light curtains diagonally cross one another over the read zone of the data reading system, and wherein the second light curtain determines a second height dimension of the item at a second time when the item crosses the second light curtain;
   a third light transmitter arranged to generate a third light curtain spanning transversely across the read zone of the data reading system, wherein the third light transmitter is offset from the first and second light transmitters such that the third light curtain does not interfere with the first and second light curtains, and wherein the third light curtain determines a third height dimension of the item at a third time when the item crosses the third light curtain;
   a speed sensing mechanism operable for determining a travel speed of the item passing through the read zone; and
   a processor operable to:
      forecast a time stamp for when the item is expected to interrupt each of the first, second, and third light curtains based on the determined travel speed;
      obtain a height measurement data and an associated time stamp for the item when the item interrupts each of the first, second, and third light curtains; and
      generate a three-dimensional model of the item based on the obtained height measurement data and the associated time stamps for each of the first, second, and third light curtains.

2. The data reading system of claim 1, wherein the first and second light transmitters are arranged such that the first and second light curtains cross one another over the read zone and are oriented at angle ranging between 80 and 95 degrees relative to each other.

3. The data reading system of claim 1, further comprising a first light receiver arranged opposite the first light transmitter and operable to detect the first light curtain, and a second light receiver arranged opposite the second light transmitter and operable to detect the second light curtain, wherein the first light curtain includes light having a first wavelength, and the second light curtain includes light having a second wavelength, wherein the first light receiver is operable to detect light having the first wavelength, and wherein the second light receiver is operable to detect light having the second wavelength.

4. The data reading system of claim 1, further comprising a lateral sensor arranged beyond an end of the read zone, the lateral sensor operable to direct a light beam for detecting a presence of the item responsive to which the processor is operable to generate the three-dimensional model.

5. The data reading system of claim 4, wherein the processor is operable to generate a binary image of the item after the lateral sensor detects the item, and wherein the binary image is used to generate the three-dimensional model of the item.

6. The data reading system of claim 5, wherein the processor is operable to initially separate the binary image into a plurality of regions-of-interest, and wherein the height measurement data is applied to each of the plurality of regions-of-interest to generate the three-dimensional model of the item.

7. The data reading system of claim 1, wherein the processor is operable to forecast the time stamp for the item based further on a distance of the item from each of the first, second, and third light curtains.

8. The data reading system of claim 1, wherein:
the first and second light transmitters are arranged such that the first and second light curtains extend diagonally across the read zone and cross one another at angle ranging between 60 and 120 degrees relative to each other; and
the third transmitter is arranged such that the third light curtain forms an angle ranging between 30 and 60 degrees relative to each of the first and second light curtains.

9. The data reading system of claim 1, further comprising:
a first light receiver arranged opposite the first light transmitter and operable to detect the first light curtain;
a second light receiver arranged opposite the second light transmitter and operable to detect the second light curtain; and
a third light receiver arranged opposite the second light transmitter and operable to detect the third light curtain.

10. The data reading system of claim 9, wherein the third light receiver is arranged more proximate to the second light receiver than the first light receiver, and wherein the second transmitter and the third transmitter are operable to generate their respective light curtains at different wavelengths.

11. The data reading system of claim 9, wherein each of the first, second, and third transmitters includes a transmitter array, and wherein each of the first, second, and third light receivers includes a receiver array.

12. The data reading system of claim 1, wherein:
the first and second light transmitters are arranged such that the first and second light curtains extend diagonally across the read zone relative to a direction of motion of a transport mechanism transporting the item through the read zone; and
the third transmitter is arranged such that the third light curtain is perpendicular to the direction of motion.

13. A data reading system for constructing a three-dimensional model of an item passing through a read zone of the data reading system, the system, comprising:
a first light transmitter operable to generate a first light curtain across the read zone of the data reading system, wherein the first light curtain determines a first height dimension of the item at a first time when the item crosses the first light curtain;
a second light transmitter operable to generate a second light curtain across the read zone of the data reading system, wherein the first and second light curtains cross one another over the read zone of the data reading system, and wherein the second light curtain determines a second height dimension of the item at a second time when the item crosses the second light curtain;
a third light transmitter arranged to generate a third light curtain spanning transversely across the read zone of the data reading system, wherein the third light transmitter is offset from the first and second light transmitters such that the third light curtain does not interfere with the first and second light curtains, and wherein the third light curtain determines a third height dimension of the item at a third time when the item crosses the third light curtain wherein the third transmitter is arranged such that the third light curtain forms an angle ranging between 40 and 50 degrees relative to each of the first and second light curtains,
a speed sensing mechanism operable for determining a travel speed of the item passing through the read zone; and
a processor operable to:
forecast a time stamp for when the item is expected to interrupt each of the first, second, and third light curtains based on the determined travel speed;
obtain a height measurement data and an associated time stamp for the item when the item interrupts each of the first, second, and third light curtains; and
generate a three-dimensional model of the item based on the obtained height measurement data and the associated time stamps for each of the first, second, and third light curtains.

14. A method for constructing a three-dimensional model of an item passing through a read zone of a data reading system, the method comprising:
generating, via a first light transmitter, a first light curtain diagonally across the read zone of the data reading system;
determining, via the first light curtain, a first height dimension of the item at a first time when the item crosses the first light curtain;
generating, via a second light transmitter, a second light curtain diagonally across the read zone of the data reading system, wherein the first and second light curtains cross one another over the read zone of the data reading system;
determining, via the second light curtain, a second height dimension of the item at a second time when the item crosses the second light curtain;
generating, via a third light transmitter, a third light curtain spanning transversely across the read zone of the data reading system, wherein the third light transmitter is offset from the first and second light transmitters such that the third light curtain does not interfere with the first and second light curtains;
determining, via the third light curtain, a third height dimension of the item at a third time when the item crosses the third light curtain;
determining, via a speed sensing mechanism, a travel speed of the item passing through the read zone;
forecasting, via a processor, a time stamp for when the item is expected to interrupt each of the first, second, and third light curtains based on the determined travel speed;
obtaining, via the processor, a height measurement data and an associated time stamp for the item when the item interrupts each of the first, second, and third light curtains; and
generating, via the processor, a three-dimensional model of the item based on the obtained height measurement data and the associated time stamps for each of the first, second, and third light curtains.

15. The method of claim 14, wherein the first and second light transmitters are arranged such that the first and second light curtains cross one another over the read zone and are oriented at angle ranging between 80 and 95 degrees relative to each other.

16. The method of claim 14, wherein the third transmitter is arranged such that the third light curtain forms an angle ranging between 40 and 50 degrees relative to each of the first and second light curtains.

17. The method of claim 14, further comprising:
detecting, via a first light receiver arranged opposite the first light transmitter, the first light curtain;

detecting, via a second light receiver arranged opposite the second light transmitter, the second light curtain; and detecting, via a third light receiver arranged opposite the third light transmitter, the third light curtain, wherein the second light curtain and the third light curtain have different wavelengths.

18. The method of claim 14, further comprising:

detecting, via a lateral sensor arranged beyond an end of the read zone, a presence of the item after the item passes through the read zone;

generating, via the processor, a binary image of the item after the lateral sensor detects the item; and utilizing, via the processor, the binary image to generate the three-dimensional model of the item.

19. The method of claim 18, further comprising:

separating, via the processor, the binary image into a plurality of regions-of-interest; and applying, via the processor, the height measurement data to each of the plurality of regions-of-interest to generate the three-dimensional model of the item.

20. The method of claim 14, wherein the processor forecasting a time stamp for the item further includes forecasting the time stamp for the item based further on a distance of the item from each of the first, second, and third light curtains.

\* \* \* \* \*